US006411575B1

(12) United States Patent
Akiyama et al.

(10) Patent No.: US 6,411,575 B1
(45) Date of Patent: *Jun. 25, 2002

(54) OPTICAL RECORDING MEDIUM HAVING AN AREA FOR RECORDING A PLURALITY OF RECORDING/REPRODUCTION CONDITIONS TO BE USED IN RECORDING/ REPRODUCTION APPARATUSES AND RECORDING/REPRODUCTION METHOD AND APPARATUS THEREFOR

(75) Inventors: Tetsuya Akiyama; Kenichi Nishiuchi, both of Hirakata; Shigeaki Furukawa, Kadoma; Kenji Narumi, Ibaraki; Hiroyuki Yamaguchi, Nishinomiya, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/349,969

(22) Filed: Jul. 9, 1999

(30) Foreign Application Priority Data

Feb. 2, 1999 (JP) ............................................. 11-024608

(51) Int. Cl.$^7$ ............................................. G11B 7/0045
(52) U.S. Cl. ............................... 369/47.52; 369/47.53; 369/47.55; 369/53.37; 369/59.14
(58) Field of Search .............................. 369/47–48, 50, 369/54, 58, 59, 116, 275.1–275.5, 47.5–47.55, 53.22, 53.25–53.27, 53.37, 59.11, 59.13, 59.14

(56) References Cited

U.S. PATENT DOCUMENTS

| 4,827,462 A | * | 5/1989 | Flannagan et al. ............. 369/32 |
| 4,989,195 A | | 1/1991 | Suzuki .......................... 369/50 |

(List continued on next page.)

FOREIGN PATENT DOCUMENTS

| EP | 0 442 566 | 8/1991 |
| EP | 0751509 A2 | 1/1997 |
| JP | 63-251938 | 10/1988 |
| JP | A-6-52547 | 2/1994 |
| JP | 06-176368 | 6/1994 |
| JP | 07-093754 | 4/1995 |
| JP | 07-105563 | 4/1995 |
| JP | 08-096513 | 4/1996 |
| JP | 08-115523 | 5/1996 |
| JP | 11-039687 | 2/1999 |

OTHER PUBLICATIONS

Patent Abstracts of Japan, Publication No. 10049875, patent document published Feb. 20, 1998.

Patent Abstracts of Japan, Publication No. 05282795, patent document published Oct. 29, 1993.

Patent Abstracts of Japan, Publication No. 07101511, patent document published Apr. 18, 1995.

Primary Examiner—W. R. Young
(74) Attorney, Agent, or Firm—Wenderoth, Lind & Ponack, L.L.P.

(57) ABSTRACT

An optical recording medium has a recording/reproduction conditions recording area for recording recording/ reproduction conditions and recording/reproduction apparatus information identifying the recording/reproduction apparatus using the recording/reproduction conditions. When the optical recording medium is accessed in a recording/ reproduction apparatus, the recording/reproduction conditions for the recording/reproduction apparatus are used. Therefore, recording or reproduction can be performed with use of optimum recording/reproduction apparatus information appropriate for the optical recording medium and for the recording/reproduction apparatus. When the optical recording medium is used for the first time, test recording is performed by using a test recording region provided in the optical recording medium, and the obtained recording/ reproduction conditions are recorded.

6 Claims, 11 Drawing Sheets

U.S. PATENT DOCUMENTS

| | | | |
|---|---|---|---|
| 5,072,435 A | * 12/1991 | Bakx | 369/48 |
| 5,155,719 A | * 10/1992 | Masakawa | 369/48 |
| 5,410,527 A | 4/1995 | Ashinuma | 369/50 |
| 5,490,126 A | 2/1996 | Furumiya et al. | 369/59 |
| 5,631,887 A | 5/1997 | Hurst, Jr. | 369/59 |
| 5,636,194 A | 6/1997 | Furumiya et al. | 369/59 |
| 5,706,271 A | 1/1998 | Hashimoto | 369/116 |
| 5,978,350 A | 11/1999 | Tobita et al. | 369/275.3 |

* cited by examiner

OPTICAL RECORDING MEDIUM HAVING AN AREA FOR RECORDING A PLURALITY OF RECORDING/REPRODUCTION CONDITIONS TO BE USED IN RECORDING/REPRODUCTION APPARATUSES AND RECORDING/REPRODUCTION METHOD AND APPARATUS THEREFOR

BACKGROUND OF THE INVENTION

1. Field of the Invention

The present invention relates to an optical recording medium, a recording/reproduction method and a recording/reproduction apparatus for recording and reproducing information by using radiation of a laser beam or the like.

2. Description of Prior Art

An optical recording medium has attracted attention as a memory having large capacity and high density. Rewritable optical recording mediums called erasable type have been developed. One of the erasable optical recording media has a recording layer made of a thin film which changes in phase between amorphous and crystalline states, and information is recorded and erased by thermal energy due to laser beam radiation. An alloy film composed of Ge, Sb, Te, In etc. as main components, for example, GeSbTe film, is known as the phase-change material for the recording layer. In many cases, information is recorded by forming marks by partially changing the recording layer to the amorphous state while information is erased by crystallization of the amorphous marks. The amorphous state is achieved by radiating a strong laser beam in pulses to heat the recording layer to a temperature not lower than the melting point thereof, and then cooling it at a predetermined or faster rate. The crystallization, on the other hand, is achieved by radiating a comparatively weak laser beam to heat the recording layer to a temperature between the crystallization temperature and the melting point.

Information is recorded in a medium by PWM recording, in which information is represented by mark lengths and space lengths (i.e. edge positions of the front and rear ends of the mark) by forming marks of different lengths with various space sections.

However, in PWM recording, if a strong laser pulse simply equivalent to the mark length is radiated for forming a long mark, the heat generated in the front portion of the mark enhances the temperature increase at the rear portion. Thus, the mark is distorted to have a narrow front portion and a wide rear portion, thereby deteriorating signal quality. Therefore, as shown in FIG. 4, it is more advantageous to form a mark by using a plurality of laser pulses including the first pulse corresponding to the front end of the mark, intermediate pulses corresponding to the intermediate portion thereof and the last pulse corresponding to the rear end thereof.

Even in this method, however, when an interval between marks is decreased, as a result of an increased recording density, the heat generated at the forming of a mark affects the formation of adjacent marks. This leads to a problem that variation of the edge positions of the marks deteriorates the signal quality. The variation of the edge position due to the thermal interference between marks depends on the length of the mark to be recorded and the length of the space sections before and after the mark. In order to solve this problem, Japanese Patent laid open Publication 7-129,959/1995 proposes a signal pattern adaptive recording compensation scheme in which the generation timings "a" and "b" of the first and last pulses in FIG. 4 are changed according to the length of the mark and the length of the space sections before and after the mark.

The optimum pulse conditions, however, depend to a larger measure on the characteristics of the medium and the recording/reproduction apparatus. Similarly, optimum servo conditions, such as focal and tracking positions and a gain for determining various servo operations on recording and reproduction, and optimum reproduction signal processing conditions, such as equalizing characteristics and a binarization slice level, are also largely dependent on the characteristics of the medium and the recording/reproduction apparatus.

Therefore, each time a recording/reproduction apparatus is activated for recording with an optical recording medium mounted therein, a test recording is carried out while changing recording/reproduction conditions such as the pulse conditions, the servo conditions and/or the reproduction signal processing conditions. Then, the quality of the reproduced signals with the measurement is compared to determine the optimum recording/reproduction conditions, and the recording of information is performed based on the optimum recording/reproduction conditions. As a result, it is a problem that this learning action for determining the optimum recording/reproduction conditions is always required on activation, thereby causing a long waiting time.

SUMMARY OF THE INVENTION

An object of the present invention is to provide an optical recording medium, a recording/reproduction method and a recording/reproduction apparatus therefor that can shorten the time required for the learning and realize a short activation time.

In one aspect of the invention, an optical recording medium for recording the information by forming a mark with laser pulses radiated thereon, comprises a information recording area provided for recording the information, and a recording/reproduction conditions recording area, to which recording by a recording/reproduction apparatus is possible, provided for recording recording/reproduction conditions representing setting values for the recording/reproduction apparatus for recording or reproducing information. Preferably, the recording/reproduction conditions recording area has enough capacity to record a plurality of sets of the recording/reproduction conditions. Preferably, the recording/reproduction conditions recording area is further used for recording apparatus information for identifying the recording/reproduction apparatus which uses the recording/reproduction conditions. Preferably, the optical recording medium further comprises a test recording area provided for test recording of a specified signal to measure a quality of a reproduced signal. The recording/reproduction conditions recording area and the test recording area are preferably interposed between the lead-in area and a region for recording the information.

In a second aspect of the invention of recording/reproduction method for recording/reproducing information by using marks formed with radiation of laser pulses on an optical recording medium, wherein lengths of the marks and those of space sections before and after the marks represent the information, recording/reproduction conditions are read from a recording/reproduction conditions recording area in the medium, to which recording by a recording/reproduction apparatus is possible. Then, information is recorded or reproduced based on the recording/reproduction conditions, wherein a plurality of pulses are radiated from a front end to a rear end of a mark when the mark is formed.

In a third aspect of the invention of a recording/ reproduction method for recording/reproducing information, recording/reproduction apparatus information for identifying a recording/reproduction apparatus which uses the recording/reproduction conditions are read from a recording/reproduction conditions recording area in the optical recording medium, besides the recording/reproduction conditions. Then, information is recorded or reproduced based on the recording/reproduction conditions accompanying the recording/reproduction apparatus information coinciding with the recording/reproduction apparatus to be used, wherein a plurality of pulses are radiated from a front end to a rear end of a mark when the mark is formed.

Preferably, in the above-mentioned two recording/ reproduction methods, test recording is performed to determine optimum recording/reproduction conditions for a recording/reproduction apparatus by changing recording/ reproduction conditions, and the obtained result is recorded in the recording region in the optical recording medium. Thereafter, recording or reproduction is performed based on the recording/reproduction conditions read from the recording region.

In a fourth aspect of the invention, an optical recording/ reproduction apparatus records and reproduces information with marks formed with radiation of laser pulses on an optical recording medium, wherein lengths of the marks and those of space sections before and after the marks represent the information. In the apparatus, a spindle motor rotates the optical recording medium. An optical head radiates a laser pulse with a laser diode onto the optical recording medium, a servo circuit drives the optical head, and a laser driver drives the laser diode according to pulse signals for recording information. A pulse controller generates pulses for driving the laser driver, wherein a plurality of pulses are generated to radiate from a front end to a rear end of the mark to record the information. An equalizer corrects the frequency characteristic of the reproduction signal, and a binarizing circuit converts the corrected reproduction signal to a binarized signal. Further, the apparatus comprises a storage device for storing recording/reproduction conditions read from a recording area provided for storing recording/ reproduction conditions in the optical recording medium, and at least one of first setting means for setting pulse conditions for the pulse controller in accordance with the recording/reproduction conditions, second setting means for setting servo conditions for the servo circuit, third setting means for setting equalizing conditions of reproduction signal to the equalizer and fourth setting means for setting a binarization slice level to the binarizing circuit.

An advantage of the present invention is that it shortens the time required for learning and realizes a short activation time.

BRIEF DESCRIPTION OF THE DRAWINGS

These and other objects and features of the present invention will become clear from the following description taken in conjunction with the preferred embodiments thereof with reference to the. accompanying drawings, and in which.

DETAILED DESCRIPTION OF THE PREFERRED EMBODIMENTS

Figure 1:
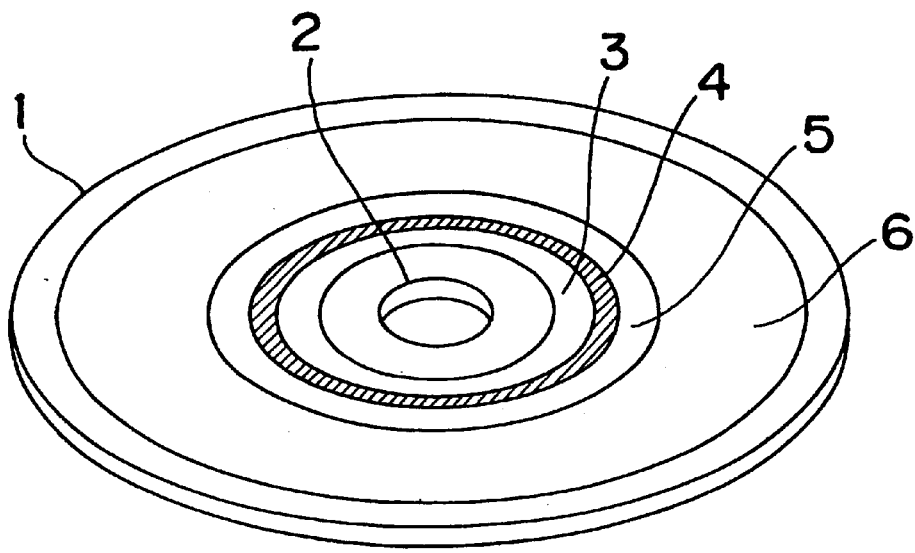
FIG. 1 is a diagram of an optical recording medium according to an embodiment of the present invention.

Referring now to the drawings, wherein like reference characters designate like or corresponding parts throughout the several views, embodiments of an optical recording medium, and a recording/reproduction method and a recording/reproduction apparatus therefor according to the invention will be explained below.

FIG. 1 shows an optical recording medium according to a first embodiment of the invention. The optical recording medium 1 has a central hole 2 for setting it to a recording/ reproduction apparatus. The substrate is formed with a guide groove (FIG. 4) for tracking a laser beam on recording or reproduction. The optical recording medium 1 has a transparent substrate made of polycarbonate of 0.6 mm thickness and a recording layer formed thereon. The recording layer is made of a GeSbTe alloy as a phase-change recording material. By radiation of a laser beam thereon, the recording layer is partially converted into an amorphous state to thereby form a recording mark. Marks of different lengths with various space sections are formed according to the PWM recording scheme in which information is represented by lengths of a mark and adjacent space sections.

The recording medium 1 has a lead-in area 3 recording medium identification information for a medium or the like with embossed pits (not shown) for address information and the like exclusive for reproduction. The recording medium 1 further comprises three recording areas 4–6 to which recording is possible by the recording/reproduction apparatus. The recording/reproduction conditions recording area 4 is provided for recording recording/reproduction conditions such as pulse conditions, servo conditions, reproduction signal processing conditions and the like. The test recording area 5 is provided for test recording of specified data in order to measure the signal quality thereof. The information recording area 6 is used for recording information. The recording area 4 for recording/reproduction conditions and the test recording area 5 are preferably arranged between the lead-in area 3 and the information recording area 6. When information is recorded in the recording medium according to the invention, the lead-in area 3 is first accessed. Then, recording/reproduction conditions recorded in the recording area 4 are read out, and based on the recording/reproduction conditions, conditions such as pulse conditions, servo conditions and reproduction signal processing conditions are set. If necessary, the test recording area 5 is used for test recording. That is, specified data are recorded as a test therein, and the quality of the signals reproduced on the recorded data for the test is checked. Information is recorded in the information recording area 6. Because the areas 3–6 are arranged in the manner described above, the distance covered by the optical head for recording is minimized for a shorter access time. Either the recording/reproduction conditions recording area 4 or the test recording area 5 may be arranged on an inner peripheral side.

When a recording medium having the configuration described above is used for the first time, the test recording is conducted while changing the recording/reproduction conditions in a recording/reproduction apparatus, and the measured quality of the signal reproduced therefrom is compared to determine optimum recording/reproduction conditions. The determined conditions are recorded in the recording area 4. When the recording medium 1 is used thereafter, the recording/reproduction conditions recorded in the recording area 4 can be read. Then, the learning for determining the optimum recording/reproduction conditions when the medium is accessed can be omitted or shortened. In this way, when the medium is mounted and the recording/reproduction apparatus is activated, the waiting time can be shortened.

Alternatively, for the learning, a simple method can be employed. The test recording is conducted while changing the recording/reproduction conditions. A result of a measurement of the quality of the signal reproduced is compared with a predetermined condition, and as soon as the result satisfies the predetermined condition, the recording/reproduction conditions obtained at the measurement are adopted as the optimum recording/reproduction conditions.

Figure 2:
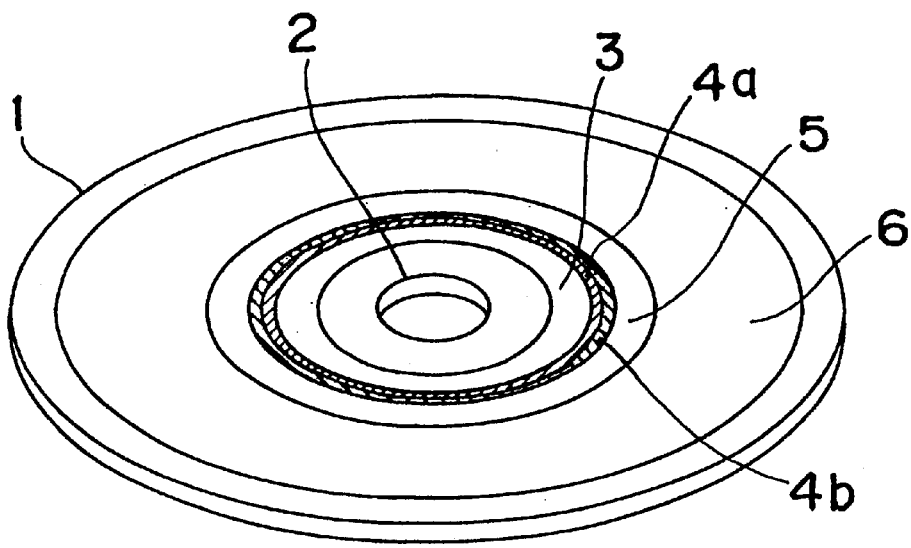
FIG. 2 is a diagram of an optical recording medium according to another embodiment of the present invention.

It is preferable that the recording area 4 provided for recording/reproduction conditions is composed of a plurality of sub-areas for recording the same information. FIG. 2 shows a optical recording medium according to a second embodiment, which is similar to that of the first embodiment, except for the recording area 4. The recording area 4 is composed of two sub-areas including a first recording sub-area 4a and a second one 4b. The first and second sub-areas 4a and 4b are provided for recording the same recording/reproduction conditions. In an example, when the recording/reproduction conditions are read, the sub-area 4a is accessed first, and if the recording/reproduction conditions cannot be read out, the second sub-area 4b is accessed. As a result, even when the information recorded in the first sub-area 1a or the second one 1b is difficult to be reproduced due to contamination of the medium or the like, it can be obtained from the other sub-area. Thus, the reliability of the recording/reproduction conditions recorded in the medium is improved.

Preferably, the recording area 4 is used as an area for recording, together with the recording/reproduction conditions, recording/reproduction apparatus information for identifying a recording/reproduction apparatus which uses the recording/reproduction conditions. In this example, the recording area 4 is assigned to have sufficient capacity for recording a plurality of sets of recording/reproduction conditions each accompanying recording/reproduction apparatus information. This configuration makes it possible to record a plurality of sets of recording/reproduction conditions in an optical recording medium and for recording, the recording/reproduction conditions suitable for the recording/reproduction apparatus used for recording are selected among the plurality of sets of the recording/reproduction conditions. As a result, when a single medium is used for a plurality of recording/reproduction apparatuses, the difference in the recording/reproduction characteristics among the apparatuses can be compensated for.

Preferably, the recording/reproduction apparatus information has a hierarchy of a plurality of levels, and has manufacturer information identifying a manufacturer of a recording/reproduction apparatus, model information identifying the model of the recording/reproduction apparatus, serial number for identifying the recording/reproduction apparatus, etc. With this configuration, even if the recording/reproduction conditions determined by the recording/reproduction apparatus to be used for recording or reproduction are not recorded in a medium, recording/reproduction conditions can be adopted which are determined by a recording/reproduction apparatus having recording/reproduction characteristics similar to those of the recording/reproduction apparatus, such as a recording/reproduction apparatus of the same manufacturer or the same model. Thus, the learning for determining optimum recording/reproduction conditions can be omitted or shortened, and the waiting time for mounting the medium and for activating the recording/reproduction apparatus can be shortened.

Further, the recording/reproduction conditions recording area 4 may be used as an area for recording time information indicating the date and time of recording of the recording/reproduction conditions in the medium, besides the recording/reproduction conditions and the recording/reproduction apparatus information. In this case, a time elapsed from the determination of the recording/reproduction conditions can be calculated for recording by use of the time information. If the time elapsed from the determination of the recording/reproduction conditions is not shorter than a predetermined length, a change in the recording/reproduction characteristics of the recording/reproduction apparatus with time can be compensated for by determining the optimum recording/reproduction conditions again.

In the embodiment described above, a GeSbTe alloy as a phase change material is used for the recording layer. As an alternative, another material such as a magneto-optic recording material or an organic pigment may be used. Further, the recording layer may be of write-once type which can be recorded only once, instead of a rewritable, erasable type. The recording/reproduction conditions in the recording area 4 can be updated or added by rewriting them over the old information for the erasable type, and by recording them after the old information for the write-once type. Thus, for the write-once type, a comparatively large capacity is required to be provided for the recording area 4 for recording/reproduction conditions.

Further, the optimum recording/reproduction conditions may be recorded in the recording area 4 beforehand at the time of shipment. In such a case, differences in the recording characteristics between the individual media can be compensated for at the time of shipment. Then, when the medium is mounted or the recording/reproduction apparatus is activated, the learning for determining the optimum recording/reproduction conditions can be omitted or shortened, thereby the waiting time can be shortened.

Figure 3:
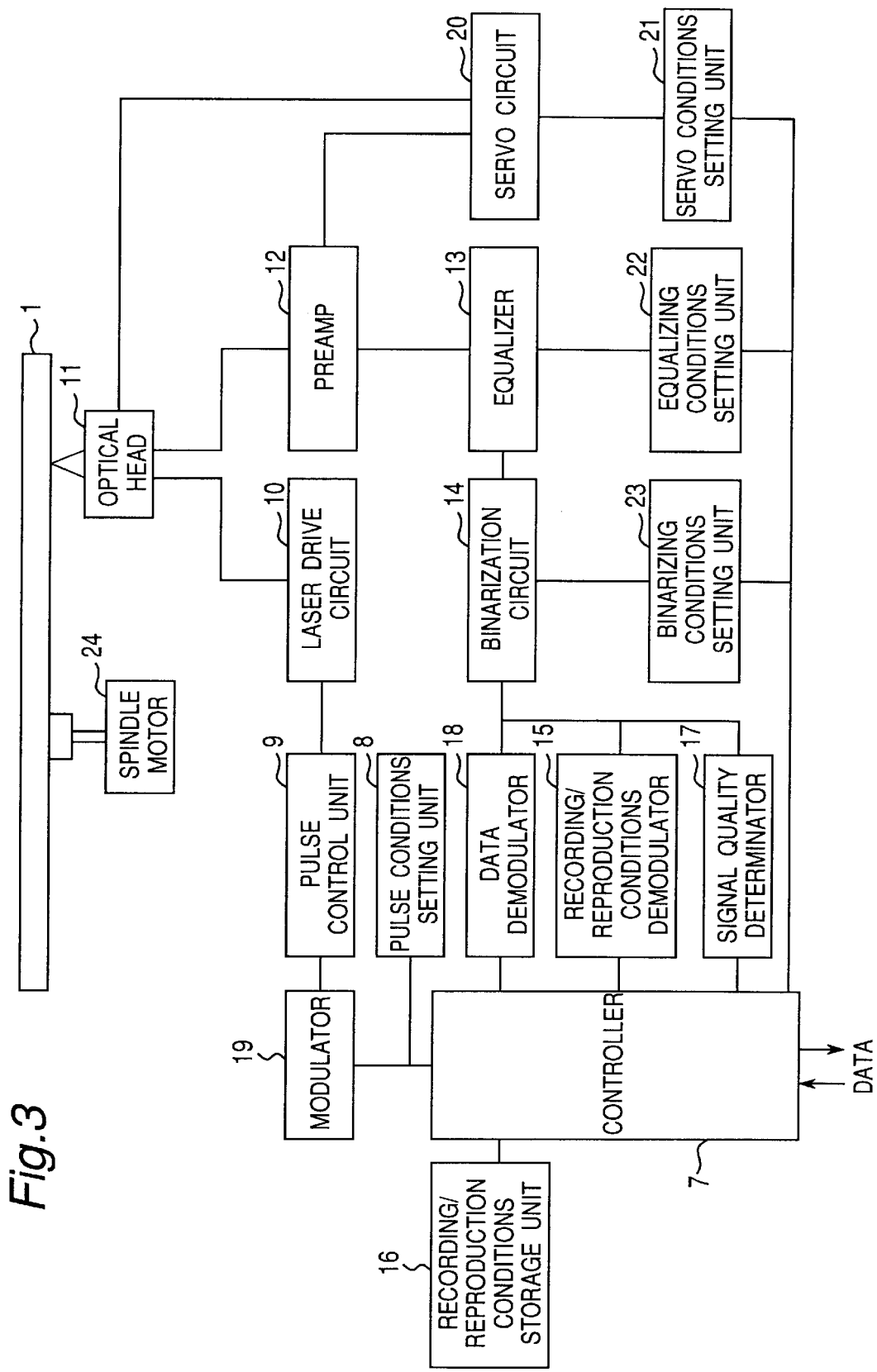
FIG. 3 is a diagram of a recording/reproduction apparatus for an optical recording medium.

Next, an apparatus and a method for recording/reproduction using the optical recording medium described above are explained. FIG. 3 is a block diagram of a recording/reproduction apparatus in which an optical recording medium 1 shown in FIG. 1 or 2 is mounted. In the recording/reproduction apparatus, a spindle motor 24 rotates the optical recording medium 1 mounted. A controller 7 controls the entire recording/reproduction apparatus. A storage unit 16 has a memory device which stores recording/reproduction conditions including pulse conditions, servo conditions and reproduction signal processing conditions, recording/reproduction apparatus information for identifying the recording/reproduction apparatus which uses the recording/reproduction conditions, and time information indicating the date and time when the recording/reproduction conditions are determined. A modulator 19 converts the data recorded into a recording signal. A pulse condition setter 8 sets the pulse conditions when the information is recorded. A pulse controller 9 controls laser pulses in accordance with the pulse conditions. A laser drive circuit 10 drives a laser diode in accordance with signals from the pulse controller 9, and an optical head 11 including the laser diode focuses a laser beam on the medium for recording information or producing the reproduction signal from the reflected light. A preamplifier 12 amplifies the reproduction signal. A servo condition setter 21 sets servo conditions to a servo circuit 20, which controls the focusing and tracking of the optical head 11 in accordance with the servo conditions based on the signal output from the preamplifier 12. An equalizer 13 corrects frequency characteristics of the reproduction signal. An equalizing conditions setter 22 sets equalizing conditions for the equalizer 13, and a binarizer circuit 14 converts the signal corrected by the equalizer 13 to a binary signal. A binarization condition setter 23 sets a binarization slice level for the binarizer circuit 14. A recording/reproduction conditions demodulator 15 demodulates, from the signal produced by the binarizer circuit 14, the data including the recording/reproduction conditions recorded in the recording/reproduction conditions recording area of the medium 1, the recording/reproduction apparatus information for identifying the recording/reproduction apparatus which uses the recording/reproduction conditions and the time information indicating the date and time of determination of the recording/reproduction conditions. A data demodulator 18 demodulates other data, and a signal quality determinator 17 determines the quality of the signal recorded or reproduced as a test from specified data in the test recording area in the medium.

Figure 4:
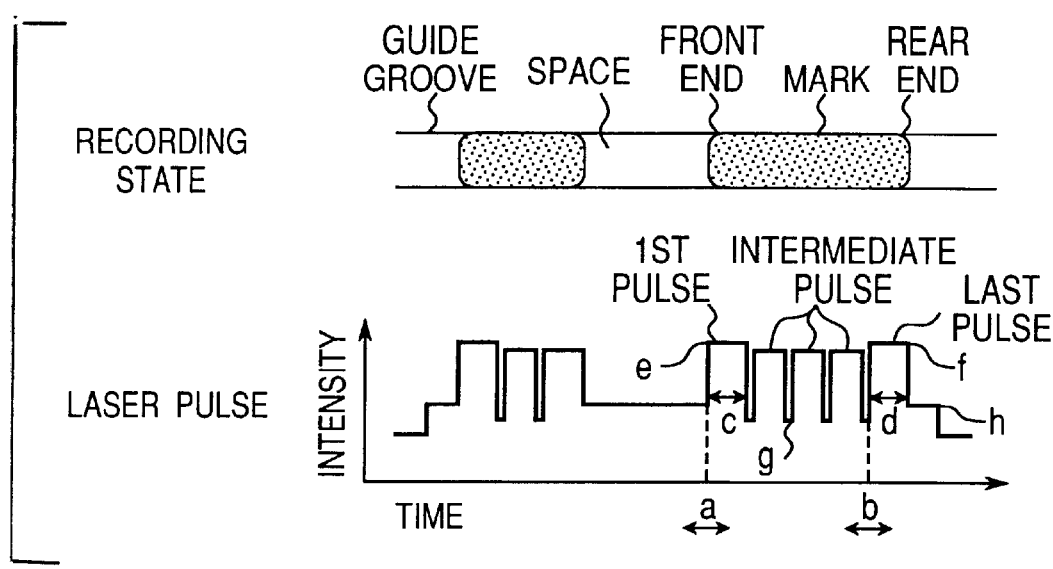
FIG. 4 is a diagram for explaining a shape of a mark and pulse conditions for forming the mark.

The information is recorded by the PWM recording scheme. As shown in FIG. 4, a plurality of laser pulses into which a laser beam is segmented include a first pulse corresponding to a front end of a mark, intermediate pulses corresponding to an intermediate portion of the mark and a last pulse corresponding to a rear end of the mark. In FIG. 4, "a", "c" and "e" designate generation timing, length and intensity of the first pulse, respectively, and "b" "d" and "f" designate generation timing, length and intensity of the last pulse, respectively. Further, "g" designates intensity of the laser beam between pulses, and "h" designates intensity of the laser beam in the space portion. In the following, the conditions for forming a laser pulse including items "a" to "h" are referred to as pulse conditions. When a mark is formed, the laser pulses are radiated while changing the generation timings "a" and "b" of the first and last pulses, respectively, according to the mark length and space lengths before and after the mark in correspondence to the mark to be recorded. By using the recording/reproduction apparatus according to this embodiment, a mark can be formed to have edges of the front and rear ends thereof at predetermined positions. In addition, information can be reproduced well from the recording mark.

Figure 5:
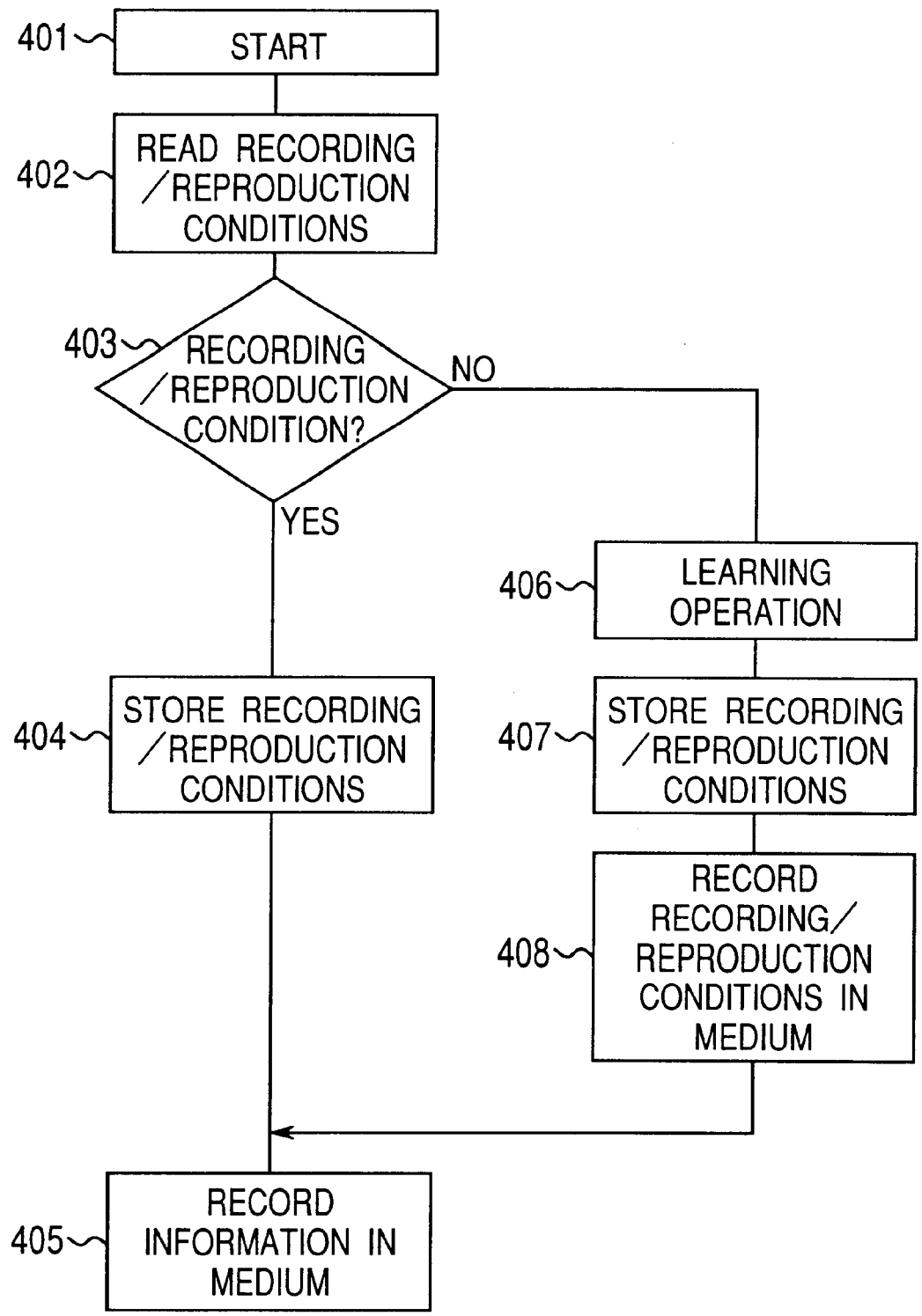
FIG. 5 is a flowchart of a first recording/reproduction method for an optical recording medium according to the invention.

Next, a recording/reproduction method for the above-mentioned recording medium shown in FIG. 1 or 2 is explained. This recording/reproduction method and others to be explained later are performed by the controller 7. FIG. 5 is a flowchart of the recording/reproduction method. First, at step 401, the recording/reproduction apparatus is activated for the recording medium 1. The recording medium 1 is mounted and rotated on the spindle motor 24. Then a laser beam for reproducing information is radiated by the optical head 11 onto the medium 1. By accessing the lead-in area 3 in the medium 1, identification information or the like of the medium recorded in the lead-in area 3 is read out. In order to read the identification information or the like, a reproduction signal obtained by the optical head 11 as a light beam reflected from the medium 1 is amplified by the preamplifier 12, and the frequency characteristics are corrected by the equalizer 13 according to predetermined equalizing conditions set by the equalizing conditions setter 22. Then, the signal is binarized by the binarization circuit 14 with a predetermined binarization slice level set by the binarization condition setter 23. The signal thus binarized is demodulated by the data demodulator 18 and sent to the controller 7. The servo circuit 20 has been set to predetermined servo conditions by the servo condition setter 21, and it controls the focusing and tracking of the optical head 11 based on the signal output from the preamplifier 12 in accordance with the servo conditions.

Then, at step 402, the recording/reproduction conditions are read. At this step, the recording/reproduction conditions recording area 4 in the medium 1 is accessed, and the servo conditions of the servo circuit 20 are set by the servo conditions setter 21 in accordance with predetermined conditions or conditions designated by the identification information of the medium. The focusing and tracking are controlled for the optical head 11 by the servo circuit 20. The reproduction signal obtained by the optical head 11 from the laser beam reflected from the medium 1 is amplified by the preamplifier 12, and the frequency characteristic is corrected by the equalizer 13 set by the equalizing conditions setter 22 to predetermined conditions or the equalizing conditions designated by the identification information of the medium. Then, the reproduction signal is binarized by the binarization circuit 14 which has been set to a binarization slice level predetermined by the binarization conditions setter 23 or a binarization slice level designated by the identification information of the medium. The signal thus binarized is demodulated by the recording/reproduction conditions demodulator 15 to be supplied to the controller 7.

Then, at step 403, it is decided whether or not the recording/reproduction conditions described above are recorded in the recording/reproduction conditions recording area 4 in the recording medium. If the conditions are decided to be recorded (YES at step 403), the recording/reproduction conditions are stored in the storage unit 16 at step 404, and the information is recorded at step 405 in the information recording area 6 in the medium based on the recording/reproduction conditions.

Figure 8:
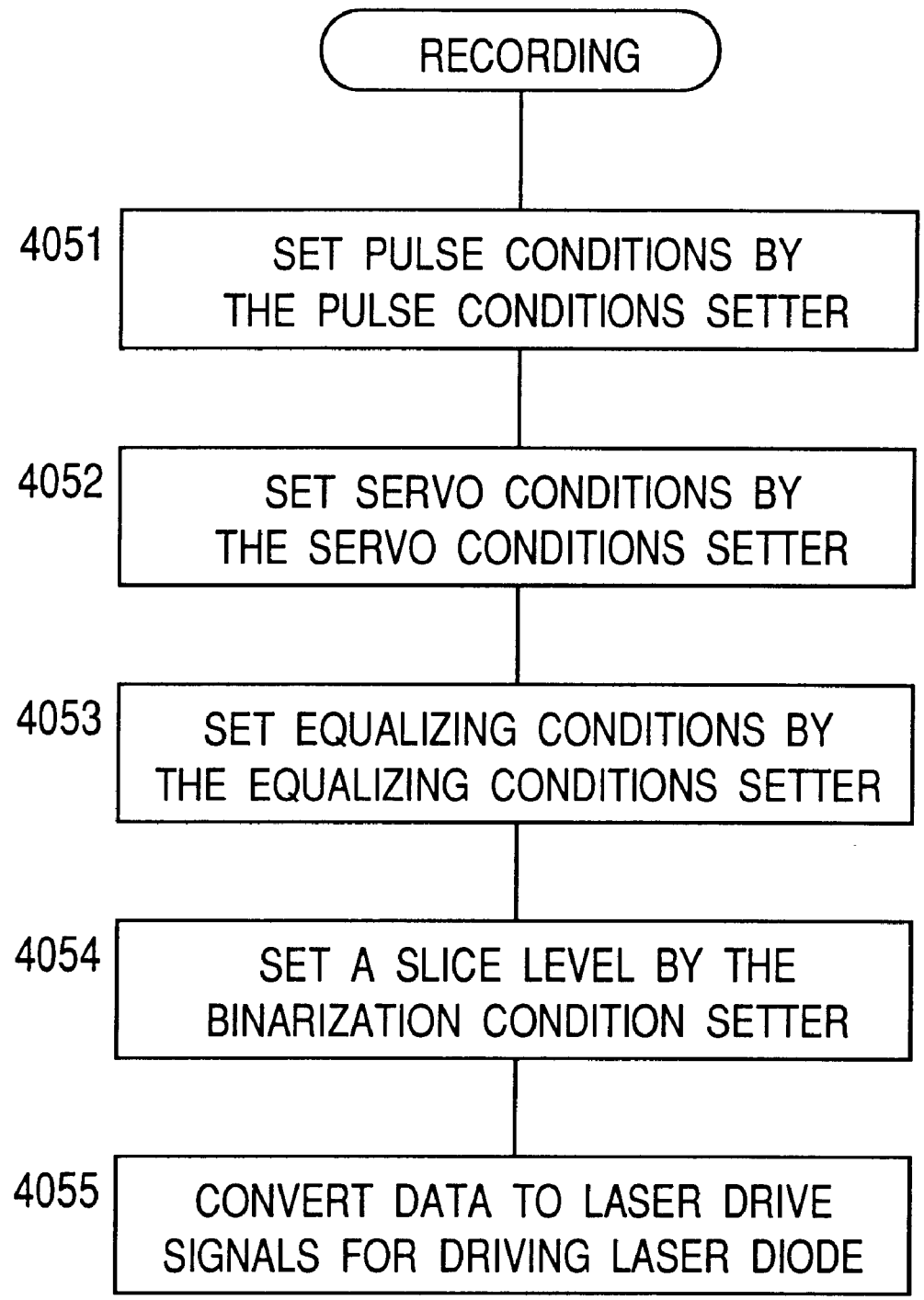
FIG. 8 is a flowchart of recording.

At step 405, the information is recorded in the following manner (refer to FIG. 8). In accordance with a content stored in the storage unit 16, the pulse conditions setter 8 sets pulse conditions to the pulse controller 9 (step 4051), the servo conditions setter 21 sets servo conditions to the servo circuit 20 (step 4052), the equalizing conditions setter 22 sets equalizing conditions to the equalizer 13 (step 4053), and the binarization condition setter 23 set a binarization slice level to the binarization circuit 14 (step 4054). The pulse conditions include, as described above with reference to FIG. 4, generation timings "a", "b", lengths "c", "d", and intensities "e", "f" of the first and last pulses, respectively, intensity "g" of the laser between the pulses, and laser intensity "h" in the space portions, which are respectively determined in accordance with the length of the mark to be recorded and the lengths of the space sections before and after the mark. The data supplied to the controller 7 are converted to a recording signal by the modulator 19, and the recording signal is converted by the pulse controller 9 to a laser drive signal satisfying the pulse conditions set by the pulse conditions setter 8 (step 4055). The laser drive circuit 10 drives the laser diode provided in the optical head 11 in accordance with the laser drive signal. The optical head 11 for which the focusing and the tracking are controlled by the servo circuit 20 focuses the light radiated from the laser diode in the optical head and forms marks on the recording layer in the medium 1 to record the information.

Figure 6:
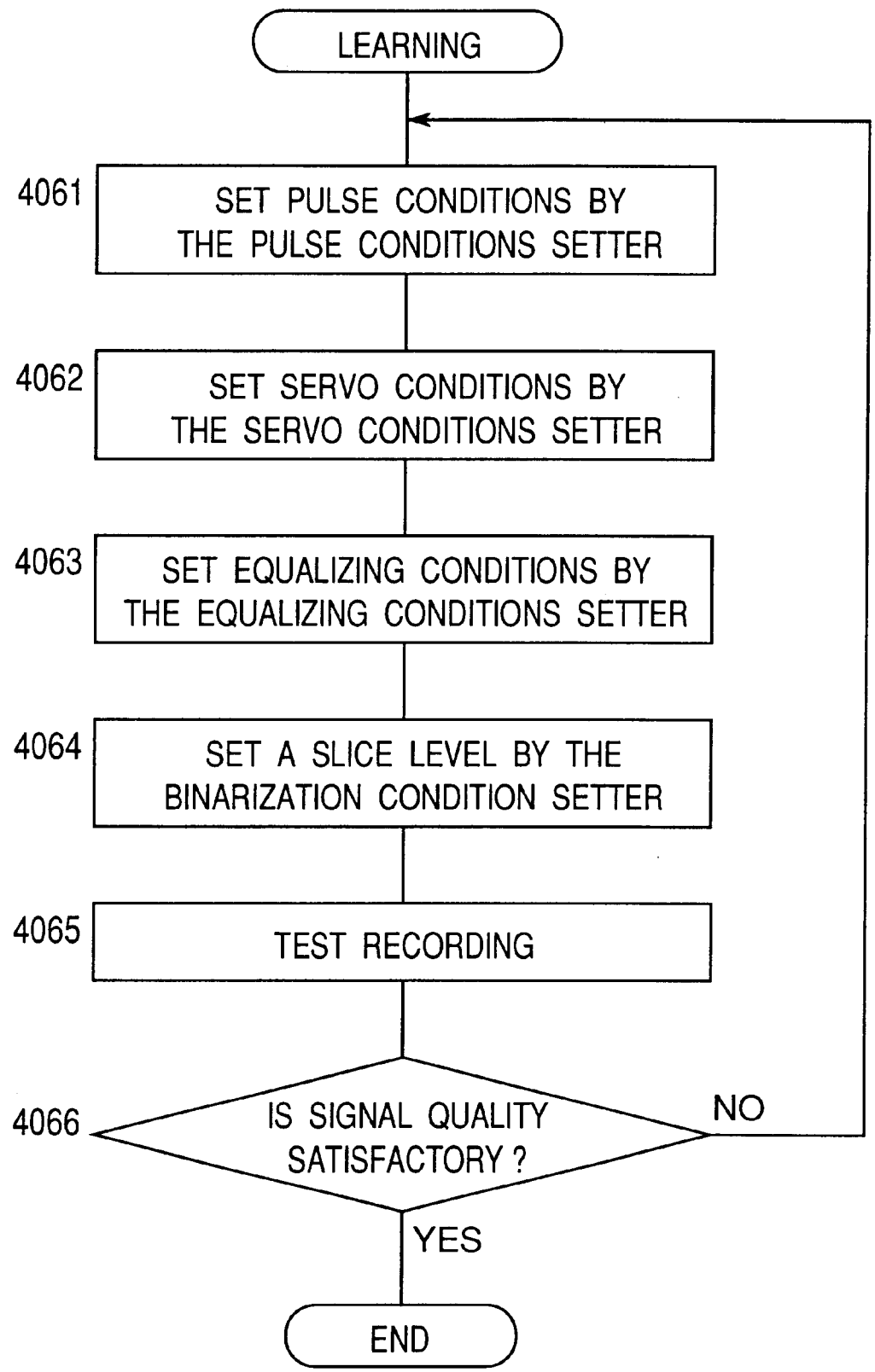
FIG. 6 is a flowchart of learning.

At step 406, learning is performed for determining the recording/reproduction conditions when it is decided that the recording/reproduction conditions are not recorded in the recording area 4 on the recording medium (NO at step 403). The learning is performed in the following manner (refer to FIG. 6). First, according to predetermined specified conditions or conditions designated by the identification information in the medium described above, the pulse conditions setter 8 sets the pulse conditions to the pulse controller 9 (step 4061), the servo conditions setter 21 sets the servo conditions to the servo circuit 20 (step 4062), the equalizing conditions setter 22 sets the equalizing conditions to the equalizer 13 (step 4063), and the binarization conditions setter 23 sets the binarization slice level to the binarization circuit 14 (step 4064). Then, the specified data outputted from the controller 7 are converted to a recording signal by the modulator 19, and recorded as a test in the test recording area 5 in the medium 1 through the same procedure as at step 405 described above (step 4065). The reproduction signal of the data recorded as the test in the medium 1 in this way is amplified by the preamplifier 12, and after correcting the frequency characteristics by the equalizer 13. A jitter value (fluctuation of the position of the reproduced signal with respect to a reference clock) of the signal binarized by the binarization circuit 14 is measured by the signal quality determinator 17, and it is compared with a predetermined criterion, to determine the signal quality (step 4066). If the jitter value satisfies the criterion, the learning is completed. On the other hand, if the jitter value fails to satisfy the criterion, the pulse conditions, the servo conditions, the equalizing conditions and the binarization slice level are successively changed, and the specified data are recorded as a test and the signal quality of the data recorded is determined. This is repeated until the jitter value satisfies the criterion. Thus, the optimum recording/reproduction conditions are determined.

Then, at step 407, the recording/reproduction conditions obtained by the learning at step 406 are stored in the storage unit 16. Then, at step 408, the recording/reproduction conditions are recorded in the recording/reproduction recording area 4 in the medium 1, and at step 405, information is recorded in the medium.

By using the procedure described above, when a recording medium is used for the first time, optimum pulse forming conditions obtained by the recording/reproduction apparatus are recorded in the recording/reproduction conditions recording area 4 in the recording medium 1. In this way, when the recording medium 1 is used again, the recording/reproduction conditions recorded in the recording medium 1 are read and stored in the storage unit 16 in order to use them. As a result, the learning for determining the optimum recording/reproduction conditions is not necessarily performed each time the medium us used, but the learning can be omitted or shortened. Thus, the waiting time can be shortened for mounting the medium and for activating the recording/reproduction apparatus.

Figure 7:
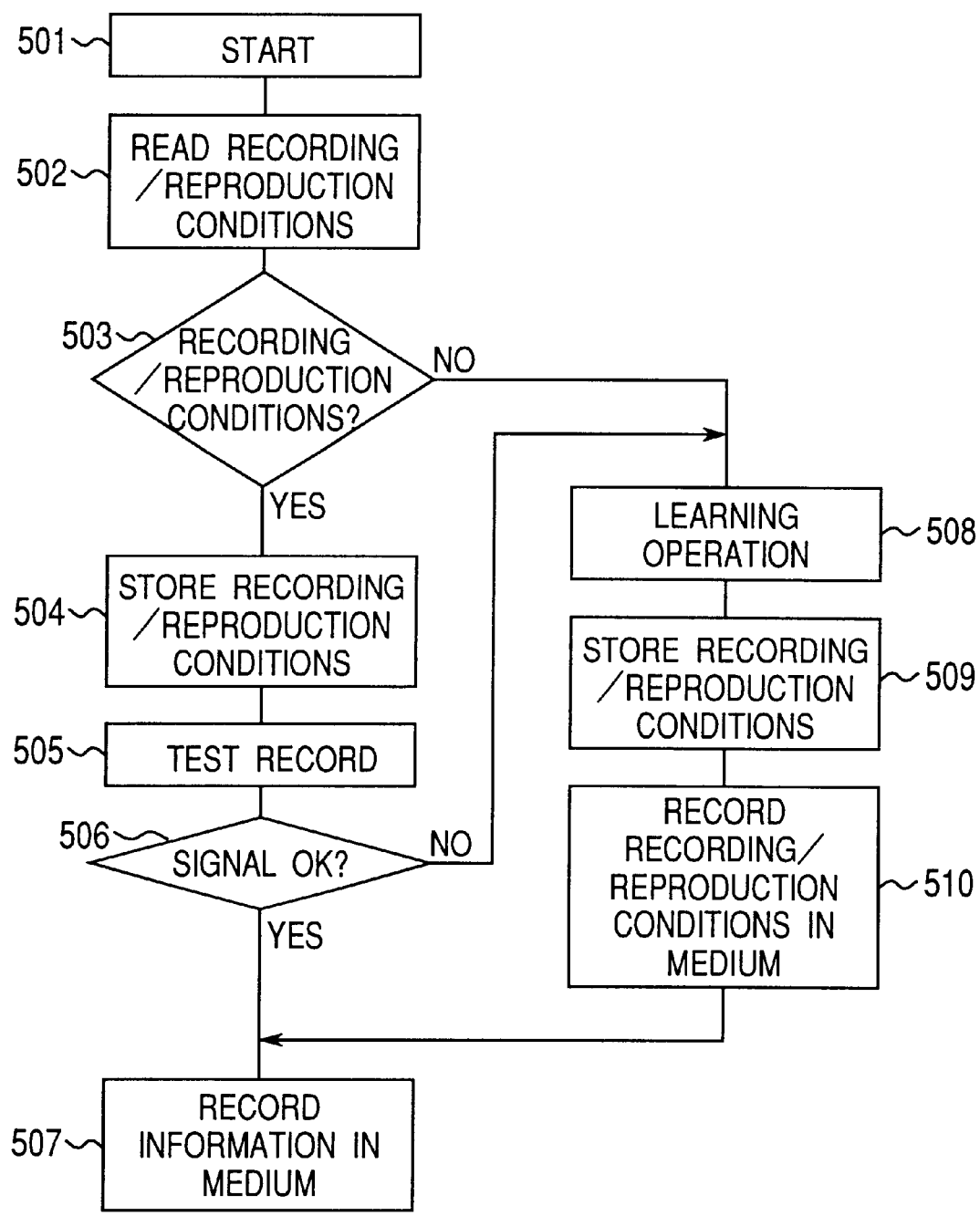
FIG. 7 is a flowchart of a second recording/reproduction method for an optical recording medium according to the invention.

FIG. 7 is a flowchart of another recording/reproduction method performed by the controller 7. The method is carried out in the same procedure as the recording/reproduction method shown in FIG. 5 except for some exceptions. Thus, only the points in FIG. 7 that are different from the recording/reproduction method described with reference to FIG. 5 will be explained below. If it is decided at step 503 that the recording/reproduction conditions are recorded in the recording area 4 in the recording medium 1 (YES at step 503), the recording/reproduction conditions are stored at step 504. At step 505, specified data are recorded as a test in the test recording area 5 in the medium 1. The test recording is conducted in the same procedure as the counterpart, step 405 in FIG. 5, except for the data to be recorded and the recording area in the medium.

Then, at step 506, the reproduction signal of the test data recorded in the test recording area 5 in the medium 1 at step 505 is amplified by the preamplifier 12, and the frequency characteristic is corrected by the equalizer 13. Then, the jitter value of the signal binarized by the binarization circuit 14 (fluctuation of the position of the signal reproduced with respect to a reference clock) is measured by the signal quality determinator 17. The measurement data is compared with a predetermined criterion to determine the signal quality. If the jitter value satisfies the criterion (YES at step 506), at step 507, the information is recorded in the information recording area 6 in the medium 1 in the same procedure as step 405. On the other hand, if the jitter value fails to satisfy the criterion (NO at step 506), the learning is performed at step 508 in the same procedure as step 406 in FIG. 5. Steps 501, 502, 509, 510 correspond to steps 401, 402, 407, 408 in FIG. 5, respectively, and they are not explained here.

The procedure described above can compensate for the change in the recording/reproduction characteristics of the recording/reproduction apparatus and for the recording medium with the lapse of time from a time point when the recording/reproduction conditions are recorded in the medium to be used for recording. Further, when the information is recorded in a recording/reproduction apparatus that is different from the current recording/reproduction apparatus, of which the recording/reproduction conditions are recorded in the medium, a difference in the recording/reproduction characteristic between apparatuses can be compensated for.

Figure 9:
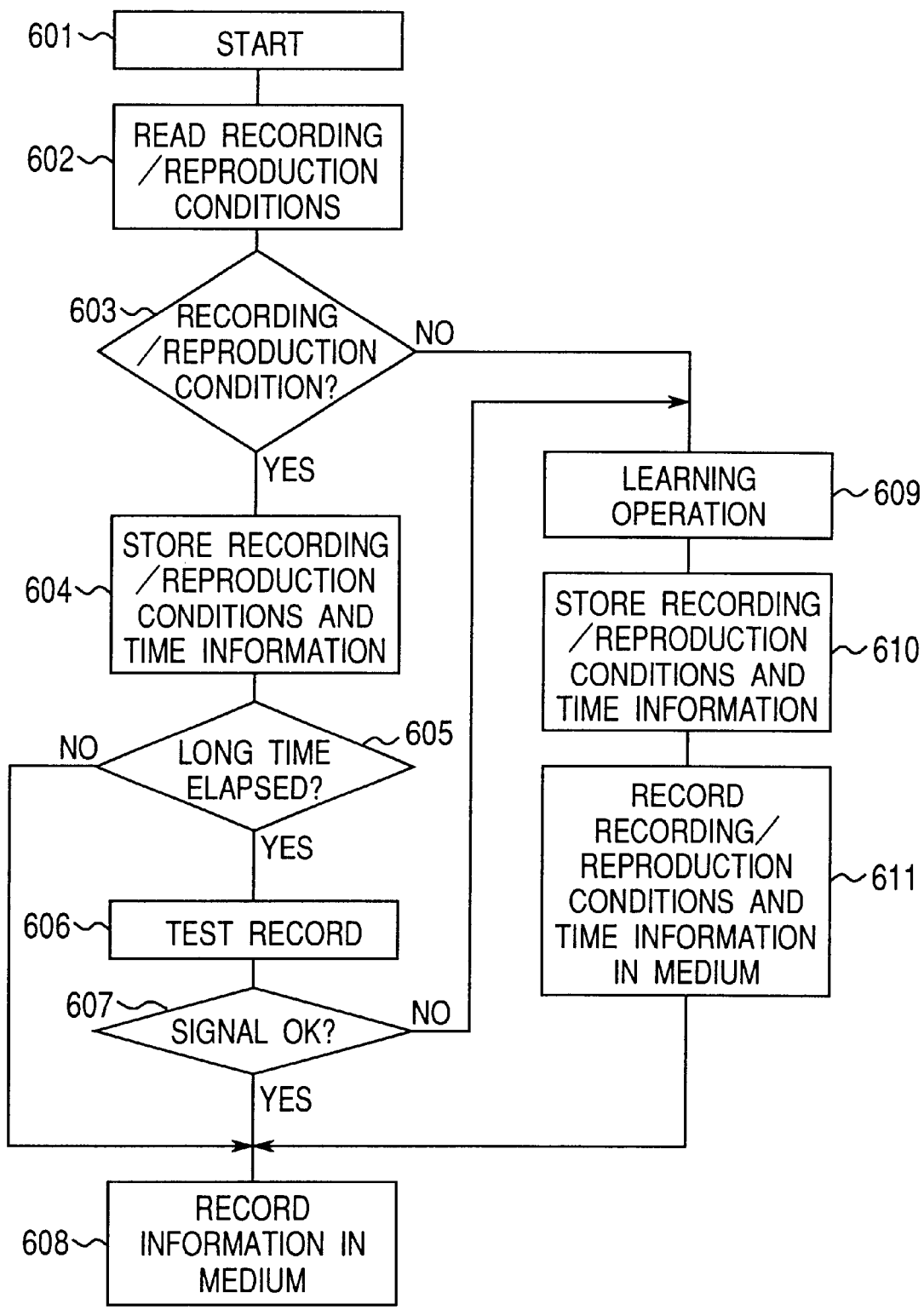
FIG. 9 is a flowchart of a third recording/reproduction method for an optical recording medium according to the invention.

FIG. 9 is a flowchart of a further recording/reproduction method according to the invention. The method is carried out in the same procedure as the recording/reproduction method shown in FIG. 7 with some exceptions. Thus, some points in FIG. 9 different from those of the recording/reproduction method shown in FIG. 7 will be explained below. In the recording/reproduction method, a recording medium is used in which the recording area 4 is also used to record, together with the recording/reproduction conditions, time information indicating the date and time when the recording/reproduction conditions are recorded in the medium.

First, steps 601, 602 correspond to steps 501, 502, respectively in FIG. 7, and they are not explained here.

At step 603, the controller 7 determines whether the recording/reproduction conditions are recorded or not in the recording/reproduction conditions recording area 4 in the medium 1. If the recording/reproduction conditions and the time information, representing the date and time when the recording/reproduction conditions are recorded in the medium, are recorded in the recording/reproduction conditions recording area 4 (YES at step 603), the recording/reproduction conditions and the time information read at step 602 are stored in the storage unit 16 at step 604. Then, at step 605, the controller 7 compares the time information with the time of a clock in the controller 7. If the difference between these times is greater than a predetermined reference value (YES at step 605), the test recording is conducted at step 606 in the same procedure as at step 505 in FIG. 7. On the other hand, if the difference is less than the predetermined reference value (NO at step 605), the information is recorded in the information recording area 6 in the medium 1 at step 608, in the same procedure as step 405 in FIG. 5 without the test recording.

Step 607 corresponds to step 506 in FIG. 7. If the determination at step 603 or at step 607 is negative (NO), the process proceeds to steps 609 to 611. At step 609, the recording/reproduction conditions are determined by a learning similar to step 406 in FIG. 5, and at step 610, the recording/reproduction conditions thus obtained are stored, together with the time when the recording/reproduction conditions are obtained (or time information), in the storage unit 16. At step 611, the obtained recording/reproduction conditions are recorded in the recording area 4 in the medium 1 together with the time information, and then the flow proceeds to step 608.

In such a case where recording media are frequently replaced in a recording/reproduction apparatus, the waiting time for activation can be shortened by omitting the above-mentioned test recording, and by compensating for a change in the recording/reproduction characteristics of the recording/reproduction apparatus and the recording medium with the lapse of time from the time point when the recording/reproduction conditions are recorded in the medium to be used.

Figure 10:
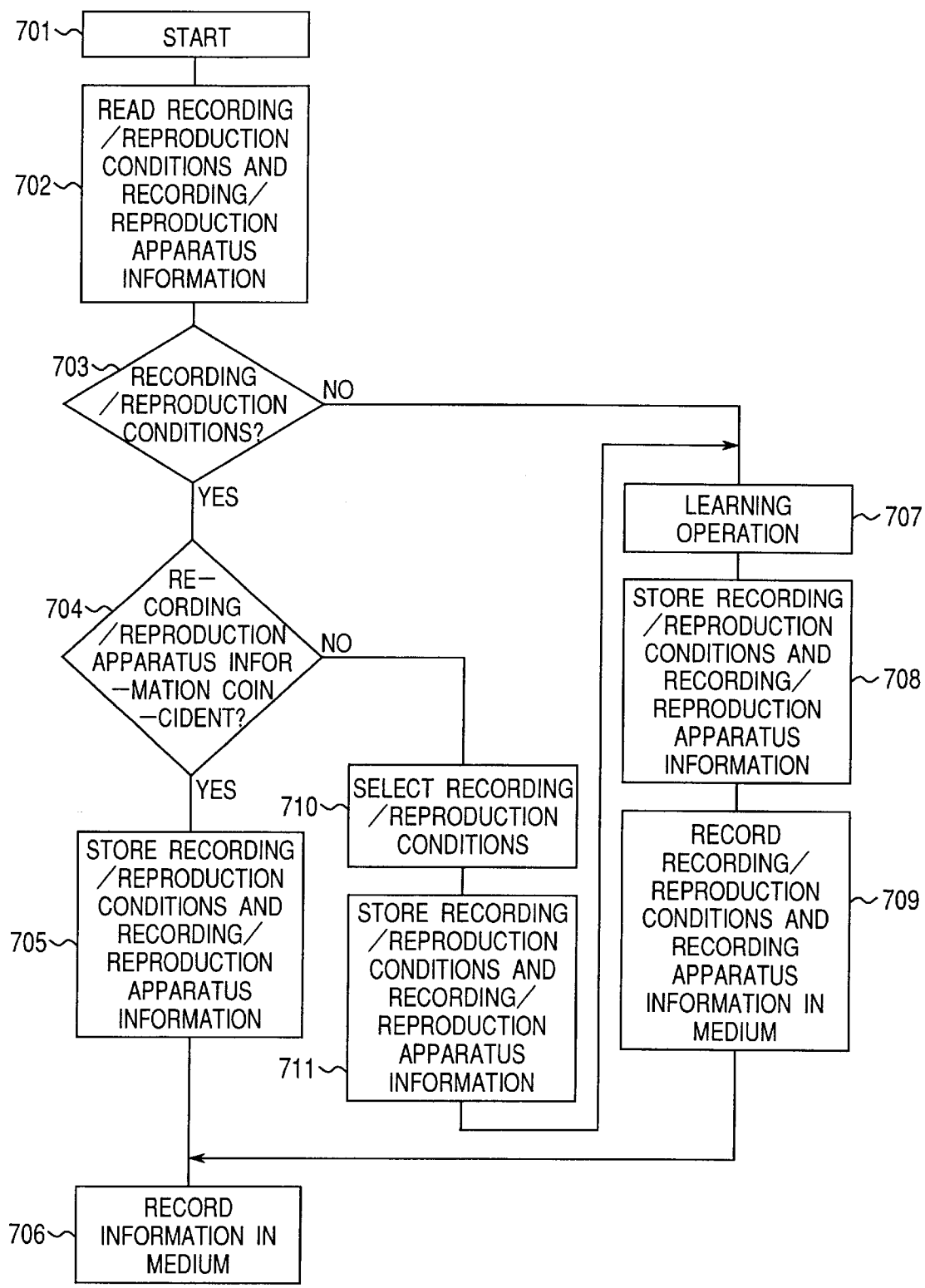
FIG. 10 is a flowchart of a fourth recording/reproduction method for an optical recording medium according to the invention.

FIG. 10 is a flowchart of a further recording/reproduction method according to the invention. This method is carried out in the same procedure as the recording/reproduction method explained with reference to FIG. 5 with some exceptions. Therefore, some points in FIG. 10 different from those of the recording/reproduction method explained with reference to FIG. 5 will be explained below. This recording/reproduction method uses a recording medium in which the recording/reproduction conditions recording area 4 in the medium records, together with a plurality of recording/reproduction conditions, recording/reproduction apparatus information for identifying a recording/reproduction apparatus using the recording/reproduction conditions. The recording/reproduction apparatus information is divided into a plurality of hierarchical levels and has manufacturer information for identifying a manufacturer of the recording/reproduction apparatus, model information for identifying a model of the recording/reproduction apparatus and a serial number for identifying a particular recording/reproduction apparatus.

First, at step 701, an activation process similar to step 401 in FIG. 5 is executed. Then, at step 702, the recording/reproduction conditions and the recording/reproduction apparatus information for identifying the recording/reproduction apparatus which uses the recording/reproduction conditions are read from the recording/reproduction conditions recording area 4 in the medium 1. Then, if it is determined at step 703 that the recording/reproduction conditions are recorded in the recording area 4 (YES at step 703), the controller 7 checks at step 704 whether or not the recording/reproduction apparatus information read from the recording area 4 contains information coincident with the recording/reproduction apparatus information of the recording/reproduction apparatus. If there is recording apparatus information coincident with the recording/reproduction apparatus information of the recording/reproduction apparatus on all points including the manufacturer information, the model information and the serial number (YES at step 704), at step 705, the recording/reproduction conditions, for which the recording/reproduction apparatus to be used are specified by the recording/reproduction apparatus information coincident with the recording/reproduction apparatus, are stored in the storage unit 16, and at step 706, the information is recorded in the recording area 6 in the medium 1, in the same procedure as step 405 in FIG. 5, based on the recording/reproduction conditions. If the determination at step 703 is negative (NO), the flow proceeds to step 707.

At step 704, if the recording/reproduction apparatus information read from the recording area 4 contains no information coincident with the recording/reproduction apparatus information of the recording/production apparatus in all points including the manufacturer information, the model information and the serial number (NO at step 704), recording/production conditions are selected from the plurality of recording/reproduction conditions read from the recording area 4 at step 710, in a priority order. High priority is given to the recording/reproduction conditions coincident on manufacturer information and model number in the recording/reproduction apparatus information using the recording/reproduction conditions, next priority is given to those coincident only on manufacturer information, and low priority is given to those coincident on no information or having no recording/reproduction apparatus information. Then, at step 710, the recording/reproduction conditions are selected, and at step 711 they are stored in the storage unit 16. Then, the flow proceeds to step 707.

At step 707, the learning is performed with the recording/reproduction conditions as initial conditions. At step 708, the recording/reproduction conditions obtained by the learning are stored in the storage unit 16, and at step 709, the recording/reproduction conditions and the recording/reproduction apparatus information of the particular recording/reproduction apparatus are recorded in the recording area 4. At step 706, the information based on the recording/reproduction conditions is recorded in the information recording area 6 in the medium 1.

At step 709, if a number of the recording/reproduction conditions accompanying other recording/reproduction apparatus information already recorded in the recording area 4 has not reached a specified number, the information is held while recording new recording/reproduction conditions and the recording/reproduction apparatus information are added. On the other hand, if the number of the recording/reproduction conditions has reached the specified number, the new recording/reproduction conditions and new recording/reproduction apparatus information are recorded, while the oldest in the recording/reproduction conditions and the recording/reproduction apparatus information are discarded.

The recording/reproduction described above makes it possible to record a plurality of recording/reproduction conditions in a medium and to select recording/reproduction conditions suitable for the recording/reproduction apparatus intended to be used for recording among a plurality of the recording/reproduction conditions read out from the medium. Therefore, when one medium is used for a plurality of recording/reproduction apparatuses, the difference in the recording/reproduction characteristics between the apparatuses can be compensated for. Further, even for a medium in which the recording/reproduction conditions determined by the recording/reproduction apparatus itself intended to be used for recording are not recorded, the learning is performed by using as initial conditions the recording/reproduction conditions determined by the recording/reproduction apparatus having a recording/reproduction characteristic similar to the recording/reproduction apparatus, such as a recording/reproduction apparatus of the same model or one made by the same manufacturer. In this way, the learning can be shortened and the waiting time can be shortened for mounting the medium and activating the recording/reproduction apparatus.

Further, when newly determined recording/reproduction conditions are recorded in a medium, if a number of the recording/reproduction conditions already recorded has reached a specified number, the oldest recording/reproduction conditions are discarded. In this way, the recording/reproduction conditions adapted for the recording/reproduction apparatuses most likely to be used can always be held in the medium.

The operation of steps 710 and 711 can be omitted. Further, the recording/reproduction apparatus information is not limited to the three hierarchical levels, but information other than the manufacturer information, the model information and the serial number can be added or a part of the information can be omitted.

Figure 11:
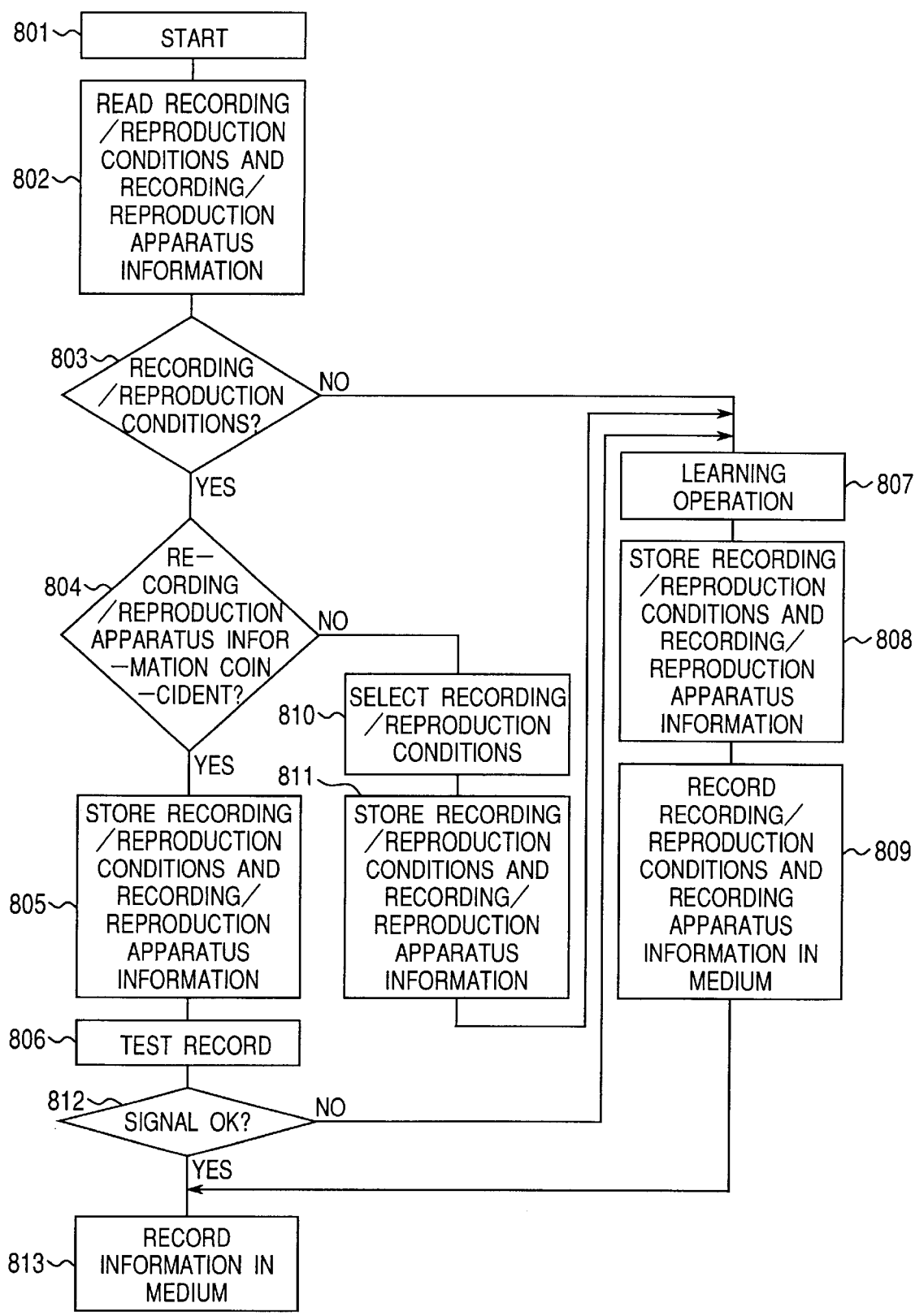
FIG. 11 is a flowchart of a fifth recording/reproduction method for an optical recording medium according to the invention.

FIG. 11 is a flowchart of a still further recording/reproduction method according to the invention. This method is carried out in the same procedure as the recording/reproduction method described with reference to FIG. 10 with some exceptions. Therefore, some points different from the recording/reproduction method of FIG. 10 will be explained.

Steps 801, 802 and 803 are similar to steps 701, 702 and 703 in FIG. 10, respectively, and they are not explained here.

At step 804, the recording/reproduction apparatus information is read from the recording area 4 in the recording medium 1. If they contain the recording apparatus information coincident with the recording/reproduction apparatus information for the recording/reproduction apparatus in all the points including the manufacturer information, the model information and the serial number (YES at step 804), at step 805, the recording/reproduction conditions, for which the recording/reproduction apparatus to be used is specified by the recording/reproduction apparatus information coincident with the particular recording/reproduction apparatus, are stored in the storage unit 16. Then, at step 806, the test recording is performed. This test recording is carried out in the same procedure as step 505 in FIG. 7. Next, at step 812, the signal quality is determined in the same procedure as step 506 in FIG. 7. If the signal quality satisfies a criterion (YES at step 812), the information is recorded in the information recording area 6 in the medium 1 at step 813.

On the other hand, if the determination fails to satisfy the criterions (NO at step 803, 804 or 812), the learning is performed at step 807, and the process proceeds to steps 808, 809 and 813 in that order. Steps 807–811 correspond to steps 707–711 in FIG. 10, respectively.

In the recording/reproduction described above, change can be compensated in the recording/reproduction characteristic of the recording/reproduction apparatus and the recording medium with the lapse of time from a time point when the recording/reproduction conditions are recorded for the medium to be used.

Figure 12:
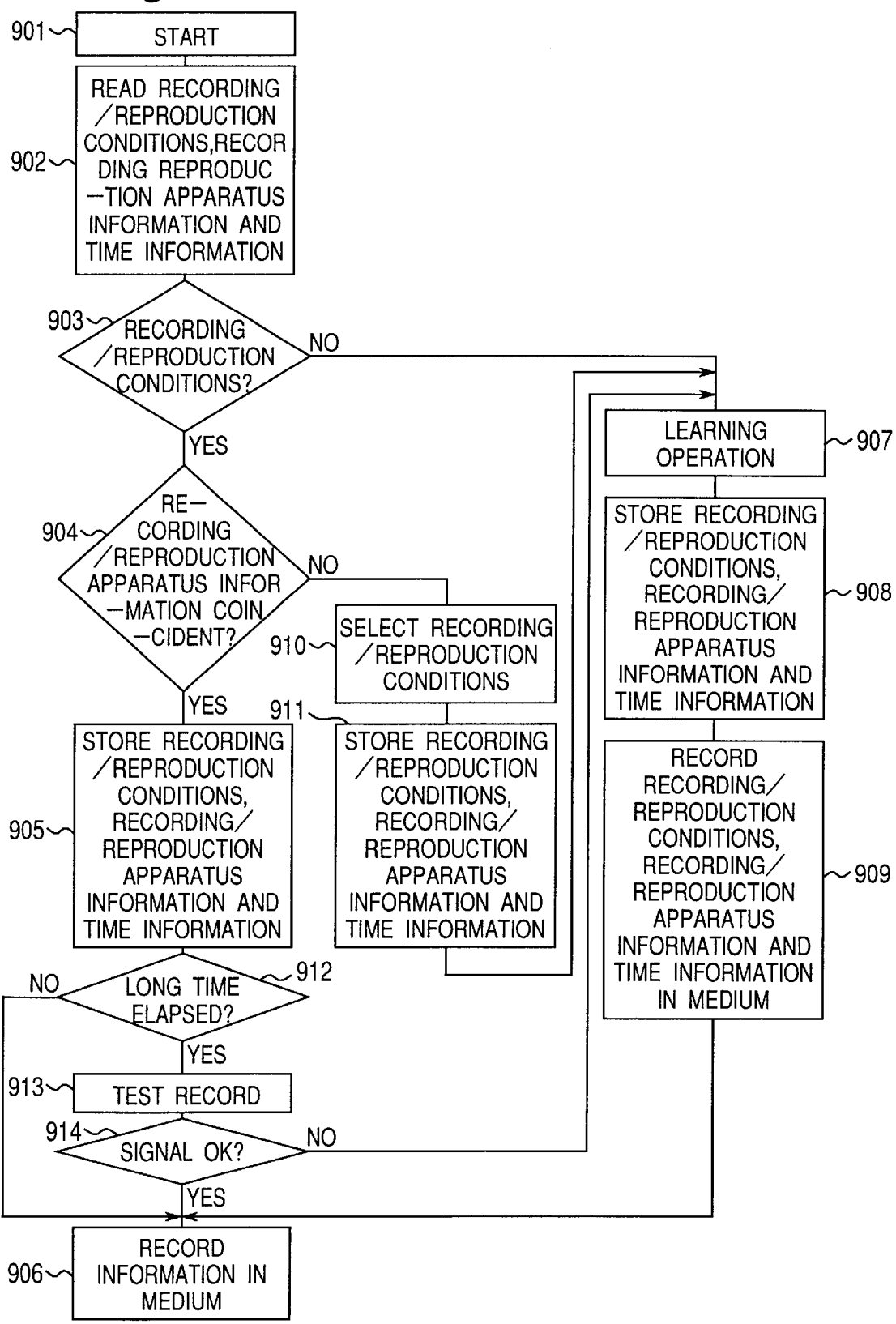
FIG. 12 is a flowchart of a sixth recording/reproduction method for an optical recording medium according to the invention.

FIG. 12 is a flowchart of a still further recording/reproduction method according to the invention. This method is carried out in the same procedure as the recording/reproduction method explained with reference to FIG. 11 with some exceptions. Therefore, some points in FIG. 12 different from the recording/reproduction method explained with reference to FIG. 11 will be explained below. This recording/reproduction method uses a recording medium in which the recording area 4 in the medium 1 is used for recording time information the date and time when the recording/reproduction conditions are recorded in the medium, together with the recording/reproduction conditions and the recording/reproduction apparatus information for identifying the recording/reproduction apparatus which uses the recording/reproduction conditions.

Steps 901 to 905 correspond to steps 801 to 805 in FIG. 11, respectively. At step 902, the time when the recording/reproduction conditions are obtained (time information) is read in addition to the recording/reproduction conditions and the recording/reproduction apparatus information, and at step 905, they are stored.

At step 912, the time information accompanying the recording/reproduction conditions stored in the storage unit 16 is compared with the time of the clock in the controller 7. If the difference is greater than a predetermined reference value (YES at step 912), the test recording is carried out at step 913. On the other hand, if the difference is less than the predetermined reference value (NO at step 912), the information is recorded in the information recording area 6 in the medium 1 without test recording. Steps 913, 914 and 906 correspond to steps 806, 812 and 813 in FIG. 11, respectively. Further, steps 907–911 correspond to steps 807–811 in FIG. 11, respectively.

In the recording/reproduction described above, a change can be compensated for in the recording characteristic of the recording/reproduction apparatus with the lapse of time from a time point when the recording/reproduction conditions are recorded in the medium to be used, while shortening the waiting time for activation by omitting the test recording if the recording medium is frequently replaced in the recording/reproduction apparatus.

According to the embodiment described above, the jitter value of the reproduced signal is measured and compared with a reference value to determine the quality of the recorded test signal. As an alternative, an error rate of the data obtained by demodulating the reproduced signal is measured and compared with a reference value in order to determine the quality of the recorded test signal.

Further, in the learning in the embodiment described above, the operation is repeated in which the recording/reproduction conditions are changed while conducting the test recording to measure the quality of the signal recorded in a test, and at the time point when the quality of the signal has satisfied a criterion, the operation is completed and the recording/reproduction conditions at that time are determined as the optimum recording/reproduction conditions. As an alternative, the test recording is performed and the quality of the signal recorded in the test is checked while the recording/reproduction conditions is changed in a predetermined range. This operation is repeated. Then, the recording/reproduction conditions included in the predetermined range which represents the best quality of the signal recorded in the test are determined as the optimum recording/reproduction conditions.

All the items of the recording/reproduction conditions may not necessarily be recorded in the medium, but only a specified item or items in the recording/reproduction conditions may be used for the learning.

Further, as to the recording/reproduction information on which the recording/reproduction apparatus to be used is specified, the information recorded in the recording area in the medium may be setting conditions or code information which satisfy the recording/reproduction conditions, in place of the recording/reproduction conditions. For example, as to the pulse conditions, the setting value of the laser drive circuit for producing the laser intensity or the code information indicating the setting value may be recorded as recording/reproduction conditions, in place of the laser intensity, in the recording area in the medium as the recording/reproduction conditions.

When the medium shown in FIG. 2 is used, at steps 402, 502, 602, 702, 802, 902 in FIGS. 5, 7 and 9 to 12, the first recording/reproduction recording area 4a in FIG. 2 is reproduced, and then if the recording/reproduction conditions cannot be read, the second recording/reproduction recording area 4b is reproduced. Further, at steps 408, 510, 611, 709, 809, 909 in FIGS. 5, 7 and 9 to 12, the recording/reproduction conditions are recorded in both the first and second recording areas 4a and 4b. This improves the reliability of the recording/reproduction conditions recorded in the medium in view of the fact that even when the information recorded in one of the first and second recording areas 4a and 4b cannot be reproduced due to the contamination of the medium or the like, the information can be obtained from the other recording area.

As described above, in an optical recording medium according to the invention, a recording/reproduction apparatus and a recording/reproduction method according to the invention, it is advantageous that the optimum recording/reproduction conditions, which are determined for a given recording medium and recorded in the medium, can be read and used in subsequent operations. This eliminates or shortens the learning for determining the recording/reproduction conditions which otherwise might be required to be measured each time. Thus, the waiting time for mounting the recording medium or activating the recording medium in the recording/reproduction apparatus can be shortened.

Further, the recording/reproduction conditions and the recording/reproduction apparatus information for identifying the recording/reproduction apparatus using the recording/reproduction conditions are recorded, and at the time of activation, the recording/reproduction conditions adapted for the recording/reproduction apparatus to be used for recording are selected for use among the recording/reproduction conditions read from the medium. Even when a specified recording medium is used for a plurality of recording/reproduction apparatuses, the operation of determining the optimum recording/reproduction conditions is eliminated or shortened, thereby making it possible to shorten the waiting time for mounting the medium and activating the recording/reproduction apparatus.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A recording/reproduction method for recording information on and reproducing information from a rewritable type optical recording medium on which a plurality of recording/reproduction conditions can be recorded together with apparatus information, said recording/reproduction method comprising;

determining an optimum recording/reproduction condition for a recording/reproduction apparatus which is to be used for at least one of recording information and reproducing information by conducting a test recording;

recording the optimum recording/reproduction condition in a first condition recording area on the rewritable type optical recording medium, and recording the same information recorded in the first condition recording area in a second condition recording area on the rewritable type optical recording medium, wherein when a number of recording/reproduction conditions recorded in the first condition recording area is a predetermined number, an oldest recording/reproduction condition is deleted from the first condition recording area and the optimum recording/reproduction condition is recorded in the first condition recording area.

2. A recording/reproduction method according to claim 1, further comprising:

reading recording/reproduction conditions and apparatus information for identifying the recording/reproduction apparatus which uses the recording/reproduction conditions from the first condition recording area; and recording or reproducing the information to or from said rewriteable type optical recording medium based on the recording/reproduction conditions accompanying the apparatus information which agrees with the recording/reproduction apparatus used for said recording or said reproducing of the information.

3. A recording/reproduction method according to claim 1, wherein when recording/reproduction conditions and apparatus information are read from said rewriteable type optical recording medium, the first condition recording area is accessed first, and if the recording/reproduction conditions and the apparatus information cannot be read for reproducing the recording/reproduction conditions and the apparatus information, the second condition recording area is accessed for reproducing the recording/reproduction conditions and the apparatus information.

4. A recording/reproduction method according to claim 1, further comprising:

performing the test recording in a test recording area provided on said rewriteable type optical recording medium, by recording specified data therein as a test based on recording/reproduction conditions accompanying apparatus information which agrees with the recording/reproduction apparatus used for recording or reproducing the information; and if a measurement result of a quality of a signal reproduced from the specified data of the test recording satisfies a predetermined criterion, recording or reproducing the information based on the recording/reproduction conditions, or if the measurement result fails to satisfy the predetermined criterion, repeating said performing of the test recording while changing the recording/reproduction conditions, determining optimum recording/reproduction conditions by measuring a quality of a signal reproduced in the test recording area and by comparing the quality with the predetermined criterion, and recording or reproducing the information based on the optimum recording/reproduction conditions while recording the optimum recording/reproduction conditions accompanying the apparatus information in the first condition recording area.

5. A recording/reproduction method according to claim 1, wherein apparatus information recorded in the first condition recording area has a plurality of hierarchical levels, said recording/reproduction method further comprising:

when recording/reproduction conditions accompanying the apparatus information which agree with the recording/reproduction apparatus to be used in all of the hierarchical levels are not recorded in the first condition recording area, selecting the recording/reproduction conditions accompanying the apparatus information agreeing with the recording/reproduction apparatus to be used at a greatest number of hierarchical levels, performing the test recording in a test recording area provided on said rewriteable type optical recording medium, by recording specified data therein as a test based on the selected recording/reproduction conditions as initial conditions; and if a measurement result of a quality of a signal reproduced from the specified data of the test recording satisfies a predetermined criterion, recording or reproducing the information based on the recording/reproducing conditions, or if the measurement result fails to satisfy the predetermined criterion, repeating said performing of the test recording while changing the recording/reproduction conditions, determining optimum recording/reproduction conditions by measuring a quality of a signal reproduced in the test recording area and by comparing the quality with the predetermined criterion, and recording or reproducing the information based on the optimum recording/reproduction conditions while recording the optimum recording/reproduction conditions in the first condition recording area together with the apparatus information of the recording/reproduction apparatus.

6. A recording/reproduction apparatus for recording information on and reproducing information from a rewritable type optical recording medium on which a plurality of recording/reproduction conditions can be recorded together with apparatus information, said recording/reproduction apparatus comprising:

a controller operable to determine an optimum recording/reproduction condition for a recording/reproduction apparatus which is to be used for at least one of recording information and reproducing information by conducting a test recording, record the optimum recording/reproduction condition in a first condition recording area on the rewritable type optical recording medium, and record the same information recorded in the first condition recording area in a second condition recording area on the rewritable type optical recording medium, wherein when a number of recording/reproduction conditions recorded in the first condition recording area is a predetermined number, an oldest recording/reproduction condition is deleted from the first condition recording area and the optimum recording/reproduction condition is recorded in the first condition recording area.

* * * * *

UNITED STATES PATENT AND TRADEMARK OFFICE
CERTIFICATE OF CORRECTION

PATENT NO. : 6,411,575 B1
DATED : June 25, 2002
INVENTOR(S) : Tetsuya Akiyama et al.

It is certified that error appears in the above-identified patent and that said Letters Patent is hereby corrected as shown below:

Column 3,
Line 56, replace "the." with -- the --.

Column 7,
Line 52, replace ""b"" with -- "b", --.

Column 12,
Line 24, replace "recording/production" with -- recording/reproduction --.
Line 27, replace "recording/production" with -- recording/reproduction --.

Column 14,
Line 13, insert -- indicating -- following "information".

Signed and Sealed this

Twenty-eighth Day of January, 2003

JAMES E. ROGAN
*Director of the United States Patent and Trademark Office*